No. 860,416. PATENTED JULY 16, 1907.
T. H. SPARKS.
COMBINED HARROW AND CORN PLANTER.
APPLICATION FILED JAN. 2, 1907.
4 SHEETS—SHEET 1.
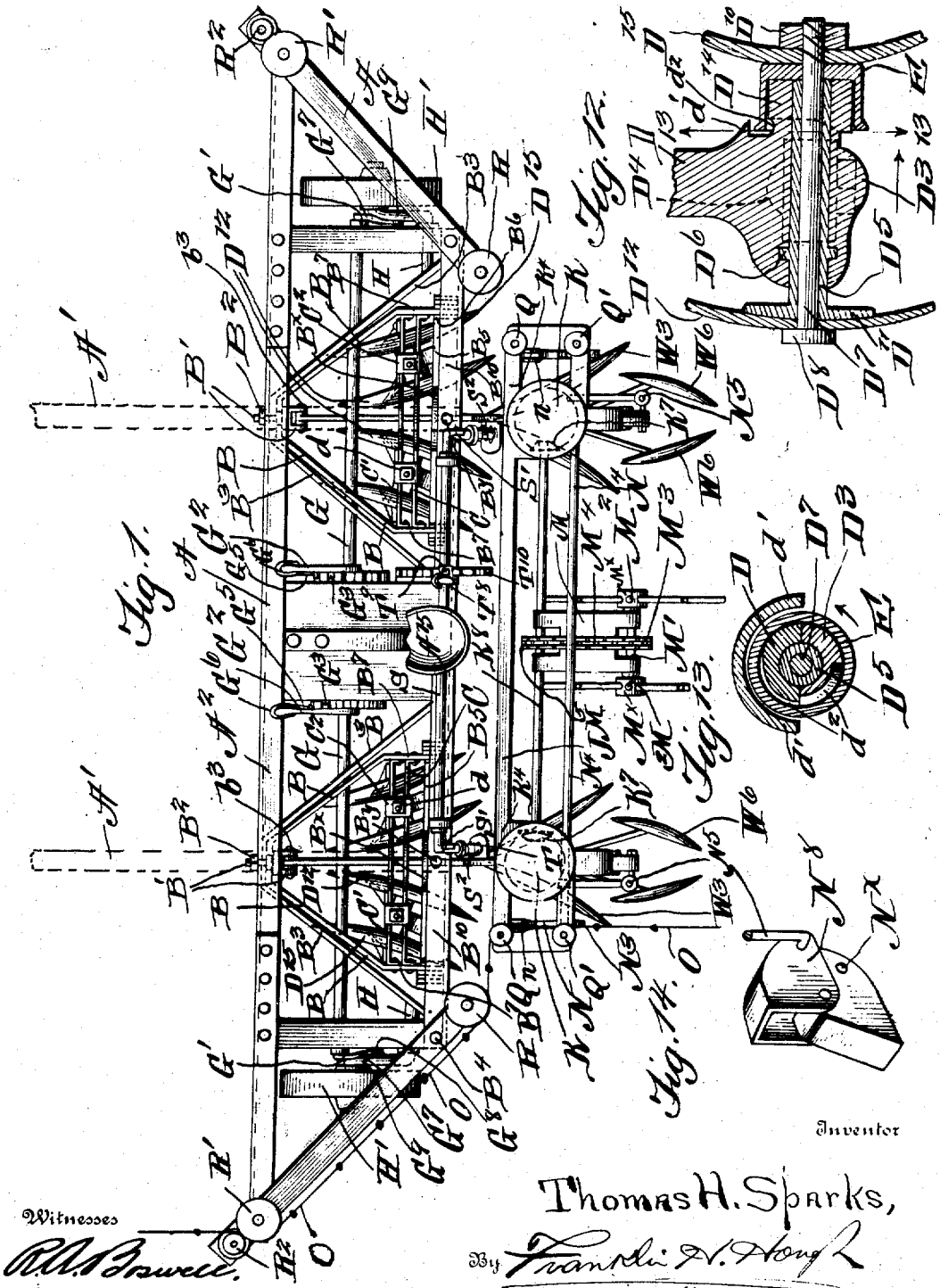
Witnesses
R.A. Boswell.
A. L. Hough.
Inventor
Thomas H. Sparks,
By Franklin N. Hough
Attorney

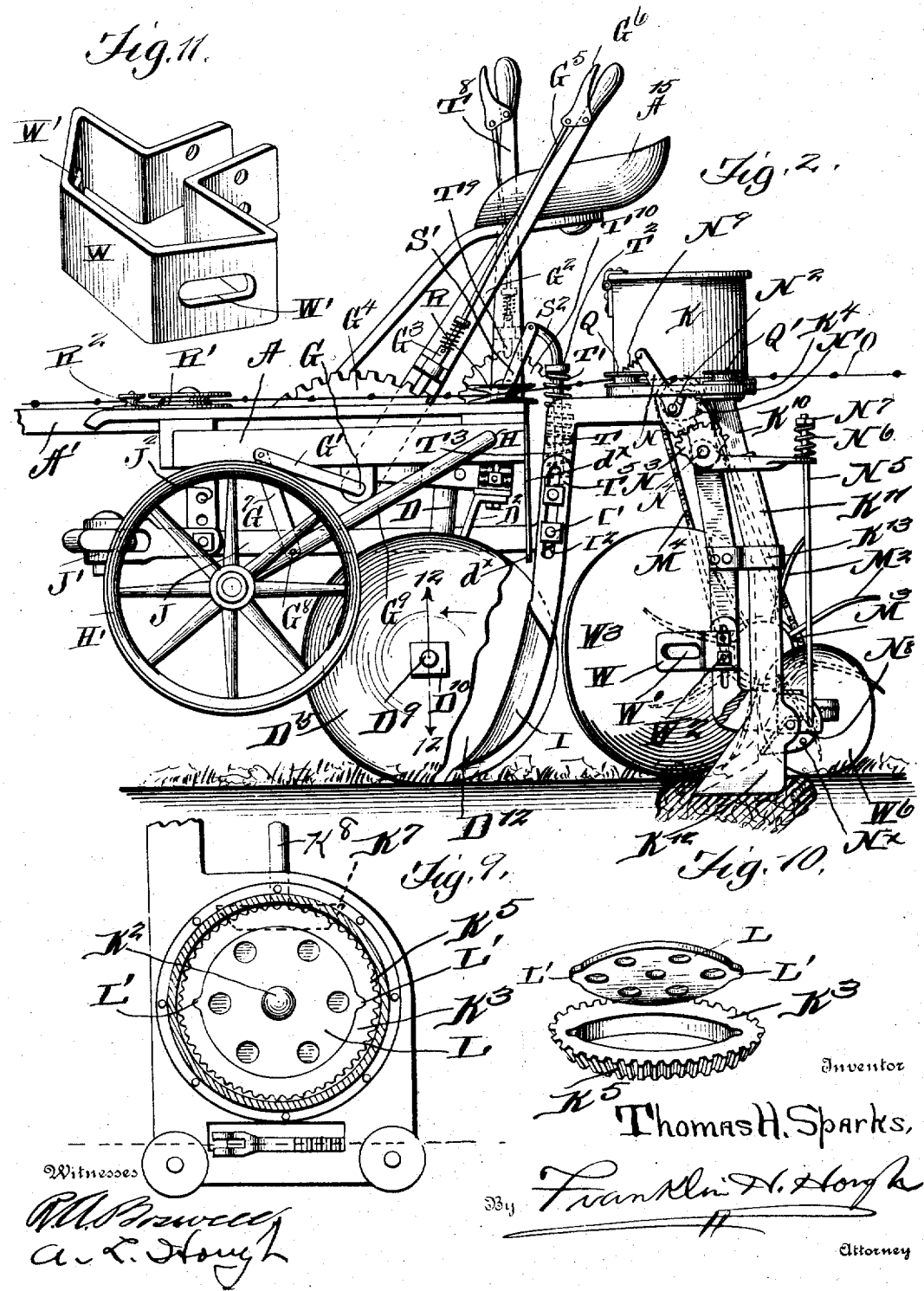

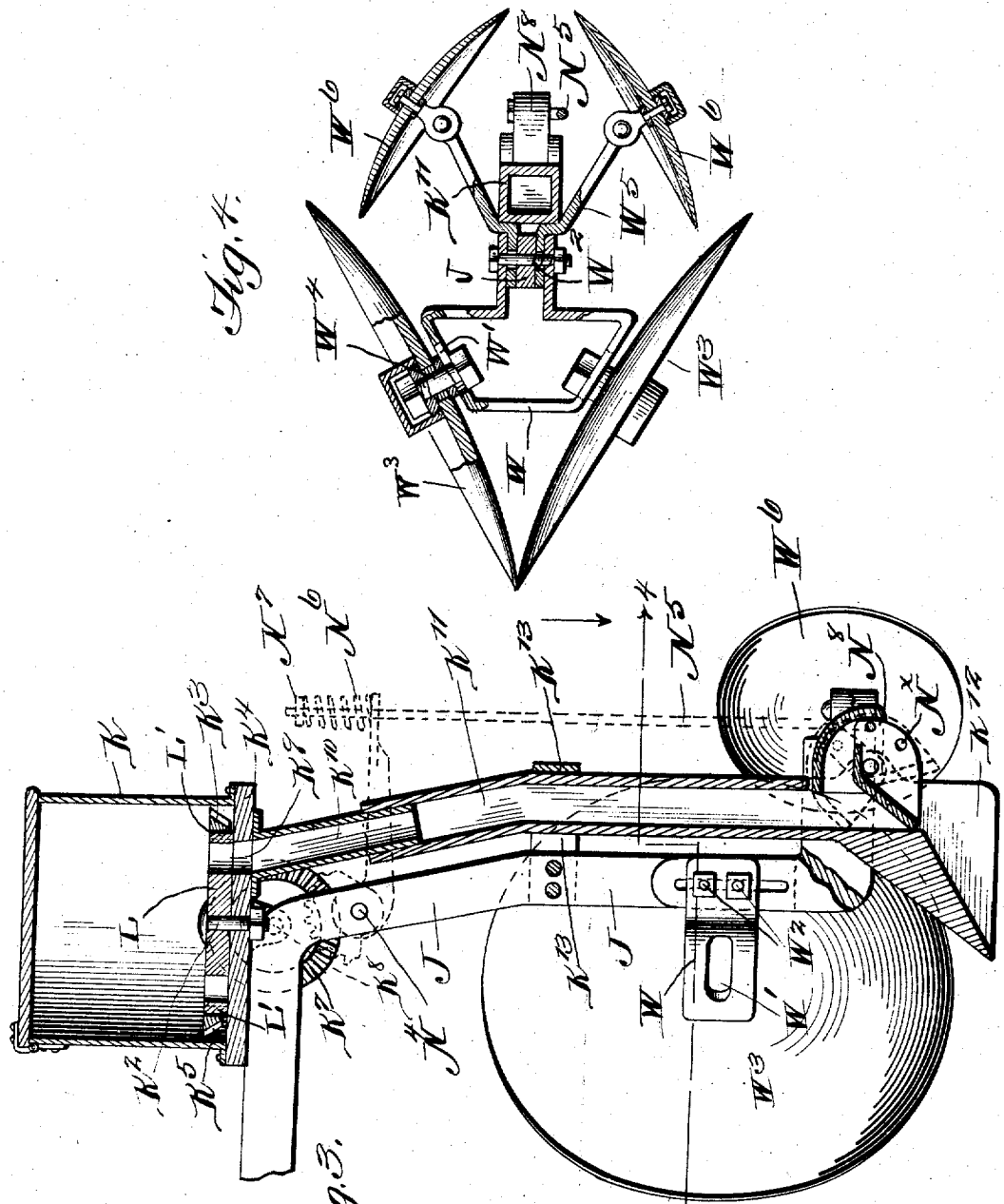

No. 860,416. PATENTED JULY 16, 1907.
T. H. SPARKS.
COMBINED HARROW AND CORN PLANTER.
APPLICATION FILED JAN. 2, 1907.
4 SHEETS—SHEET 4.
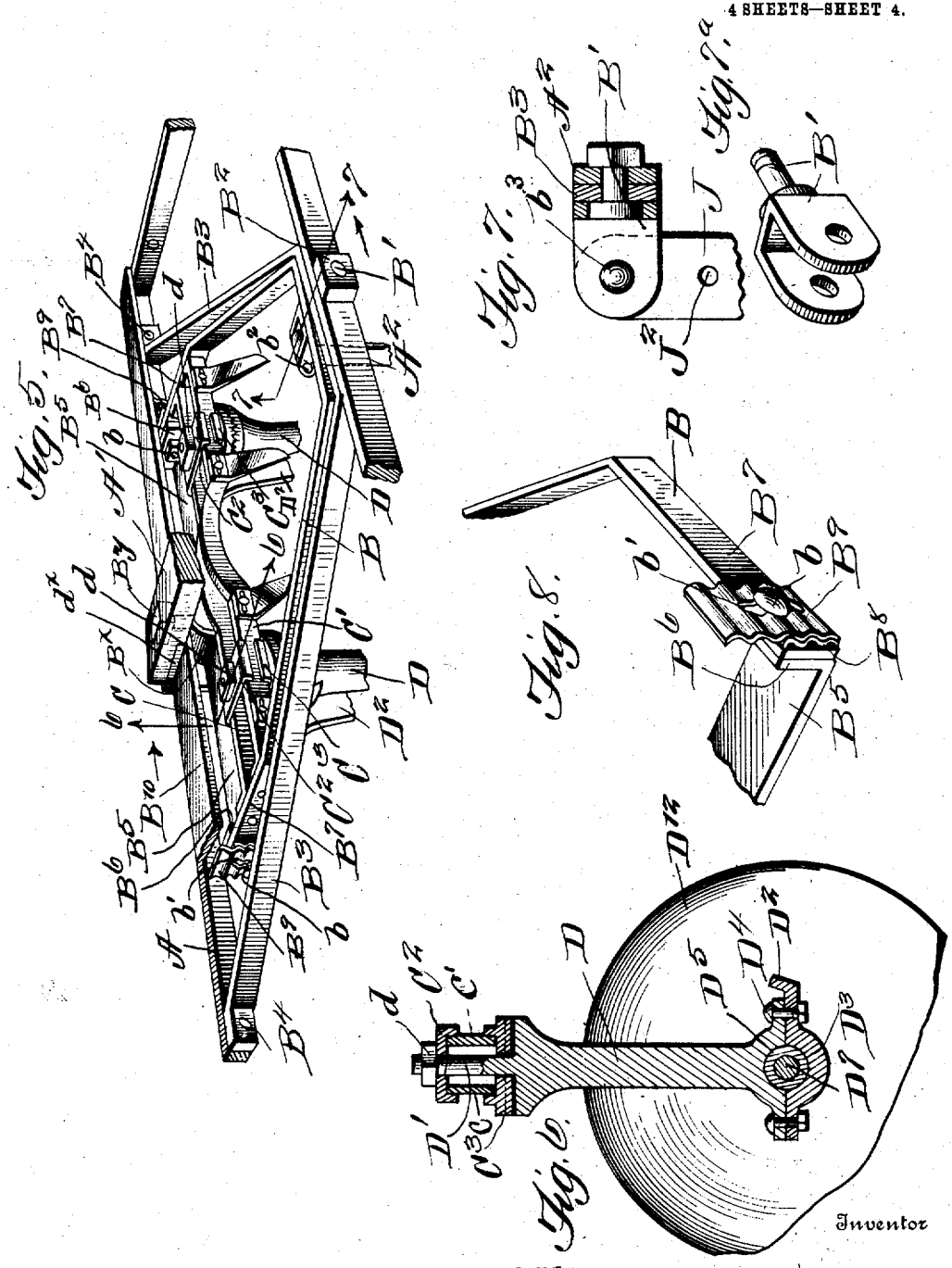
Witnesses
Inventor
Thomas H. Sparks,
By Franklin N. Hough
Attorney

UNITED STATES PATENT OFFICE.

THOMAS H. SPARKS, OF WICHITA, KANSAS.

COMBINED HARROW AND CORN-PLANTER.

No. 860,416.　　　　　Specification of Letters Patent.　　　Patented July 16, 1907.

Application filed January 2, 1907. Serial No. 350,397.

*To all whom it may concern:*

Be it known that I, THOMAS H. SPARKS, a citizen of the United States, residing at Wichita, in the county of Sedgwick and State of Kansas, have invented a certain new and useful Improvement in a Combined Harrow and Corn-Planter; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in combined harrow and planter mechanism, and comprises a means whereby the soil may be treated by harrows and drills for the reception of corn or other seed, and comprises various other details of construction and combinations and arrangements of parts which will be hereinafter fully described and then specifically defined in the appended claims.

I illustrate my invention in the accompanying drawings, in which:

Figure 1 is a top plan view of my invention. Fig. 2 is a side elevation of the apparatus. Fig. 3 is a sectional view vertically through one of the feed receptacles and spout leading therefrom, showing parts in elevation. Fig. 4 is a sectional view on line 4—4 of Fig. 3. Fig. 5 is a detail perspective view, parts being shown in section. Fig. 6 is a vertical sectional view on line 6—6 of Fig. 5. Fig. 7 is a sectional view on line 7—7 of Fig. 5. Fig. 7$^a$ is a detail perspective view of a clevis member through which the section Fig. 7 is taken. Fig. 8 is a detail perspective view showing the adjustable means for regulating the tilting movement of the frame carrying the harrow disks. Fig. 9 is a sectional view through one of the feed cups or hoppers. Fig. 10 is a detail perspective view of portions of one of the feed cup rings and perforated disk therein. Fig. 11 is a detail perspective view of the yoke. Fig. 12 is a sectional view, taken at right angles to the section shown in Fig. 6, through the lower portion of the standard and parts carried thereby. Fig. 13 is a sectional view on line 13—13 of Fig. 12, and Fig. 14 is a detail perspective view of a shutter or second drop when the apparatus is utilized as a check row planter.

Reference now being had to the details of the drawings by letter, A designates the main frame of the apparatus which has two shafts or poles A' secured thereto, whereby a plurality of teams may be attached to the apparatus. Upon either side of the central portion of the frame are mounted two swiveled frames which are of general triangular shape and designated each by letter B. The forward tapering end of each frame B is connected by means of a clevis B' to the forward cross-piece A$^2$ of the main frame, each clevis being held in place by means of a nut B$^2$. Suitable braces B$^3$, which are bent substantially the shape of said frames B, are also held to said beam by means of a clevis B' and their rear ends fastened by bolts B$^4$ to the main frame. The rear end of each frame B is arched, as at B$^x$, and a bolt B$^y$ passes through said arched portion and also a projecting flange B$^{10}$ and a bar $b^x$, which bolt serves as a pivot, allowing the frame to tilt thereon. The rear portions of the wings of each frame B are parallel to each other, said parallel portions being designated by letter B$^7$, and are connected together by means of a bar B$^5$ having angled ends B$^6$, a detail of which construction is clearly shown in Fig. 8 of the drawings.

Two corrugated plates, one designated by letter B$^8$ and the other by letter B$^9$, are mounted upon each parallel portion B$^7$, the former of which plates has an aperture to receive the shank portion of the bolt $b$ while the other plate B$^9$ has an elongated slot $b'$ to allow for the vertical adjustment of the plate B$^9$. The upper end of each corrugated plate B$^9$ is adapted to contact with the under surface of the laterally projecting flange B$^{10}$, shown clearly in Fig. 5 of the drawings, in order to limit the rocking movement of the frame B, whereby the harrow disks carried thereby may adapt themselves to the irregular surface of the ground over which the apparatus is adapted to be drawn.

Cross pieces C and C' having angled ends connect the two parallel portions B$^7$ of each frame B, and are spaced apart. Angle plates C$^2$ and C$^3$, shown clearly in Figs. 5 and 6, are adapted to be clamped over the upper and lower edges, respectively, of the bars C and each of said clamping plates is centrally apertured to receive the contracted end D' of the standard D, a suitable nut $d$ being mounted upon the upper threaded end of said contracted portion D', whereby the plates C$^2$ and C$^3$ may be held in clamping relation with the upper and lower edges of said bars C and C' respectively. The under surface of the clamping plate C$^3$ flares outwardly and has serrations on its under surface adapted to engage serrations on the shoulder of the upper portion of the standard D, as shown clearly in Figs. 5 and 6, whereby the standard D may be held from turning. Each standard has a brace D$^2$ connected thereto, the forward end of which is fastened to the frame of the apparatus. Referring to Fig. 6, it will be noted that the lower end of the standard D has a bearing plate D$^3$ held thereto by means of the bolts D$^4$, and is adapted to hold the hollow bearing shaft D$^5$ in the position shown in Fig. 12 of the drawings. Said bearing shaft D$^5$ has a shoulder D$^6$ which turn in grooves formed in the lower end of the standard D and in the plate D$^3$ and serve to hold the same against longitudinal movement. A stub shaft D$^7$ is mounted to rotate within said hollow bearing shaft and has a head D$^8$ at one end and its other end D$^9$ is threaded to receive a nut $D^{10}$. One end of the hollow bearing shaft $D^5$ has a flaring head $D^{11}$ and between which and the head $D^8$, a harrow disk $D^{12}$ is designed to be clamped.

E designates a cup-shaped member which is centrally apertured to receive the shaft $D^7$ and is adapted to fit over the laterally projecting portions $D^{14}$, being clamped in such position by means of the harrow disk $D^{15}$ and the nut $D^{10}$. The purpose of the cup E is to prevent any dirt which might be raised by the harrow disks $D^{15}$ coming in contact with the bearing surface of the shaft $D^7$. Said projecting portions $D^{14}$ of the standard D and the plate $D^3$ are provided with registering grooves $d^2$ through which any dirt which falls over the end of the cup might fall by gravity to the ground. It will be noted that the standard D has a semi-cylindrical flange, designated by $d'$, shown clearly in Figs. 12 and 13 of the drawings, which overhangs the inner end of the cup and serves to prevent dirt falling upon said flange from getting into the bearings.

Mounted in suitable bearings in the frame of the apparatus are the two rock shafts G G, each having a crank arm $G'$, and $G^2$ designate operating levers which are fixed one to each of said shafts and each lever carries a spring-pressed pawl $G^3$ which is adapted to engage the teeth of the segments $G^4$ in order to hold the lever and shaft in any position into which it is turned. Each spring-pressed dog $G^3$ is each connected to a rod $G^5$, which in turn is pivoted to the hand grip $G^6$ upon the lever, said levers being positioned one upon either side of the seat $A^{15}$, as shown clearly in Fig. 1 of the drawings. Pivotally connected to the crank arm $G'$ of each shaft is a link $G^7$, which in turn is pivoted at $G^8$ to a crank arm $G^9$ of the drop axle H upon the end of which are journaled the wheels $H'$. By this arrangement of apparatus, it will be noted that by the swinging forward of the two operating levers $G^2$, the wheel $H'$ may be thrown down against the ground and by further forward movement upon the levers, the disk harrows may be raised from the ground and the apparatus thrown out of operation, when it is desired to do so for any purpose. In Fig. 2 of the drawings, the wheels $H'$ are shown as being thrown to their highest positions and the harrow disks down in operative positions.

A second frame designated in the drawings by letter J, shown clearly in Fig. 2, is provided which forms a part of the apparatus, said frame being angular-outlined and to the forward end of which a clevis $J'$ is connected, to which latter a whiffletree or evener is adapted to be connected. It will be noted that the forward ends of the frame J are upturned and provided with perforations $J^2$, whereby the clevis may be held at different locations, accordingly as it might be desired to cause the plows, which will be presently described, to cut at different depths underneath the surface of the soil. The two forward angled ends of the frame J are pivotally connected each upon a pin $B^2$ carried by the clevis $B'$ and as clearly shown in Fig. 7 of the drawings. Said frame J has a vertical tilting movement and is prevented from moving laterally by means of the guide fingers or bars $d^x$ Fig. 2 which are fastened to the frame and positioned one upon each side of the horizontally disposed portion of the frame J, one of said guide fingers only being illustrated in Fig. 2 of the drawings. It will be noted upon reference to Fig. 1 of the drawings that the two sets of disk harrows upon either side of the apparatus are positioned at angles to each other, the innermost of said disks being spaced apart slightly, thereby leaving a ridge of ground between the harrows as the apparatus passes over the ground. Mounted upon the frame J of the apparatus and between the innermost pair of the harrow disks upon either side of the apparatus, is a plow I, shown clearly in Fig. 2 of the drawings, and $I'$ are adjusting bolts which pass through an elongated slot $I^2$ in the shank portion of the shovel and affords means whereby the latter is allowed to be raised or lowered, after which it is held in an adjusted position by nuts mounted upon said bolts $I'$. The purpose of said plows is to cut the ridge left between the innermost of the two harrow disks upon either side of the apparatus.

Mounted upon raised horizontal portions of the frame J are the seed hoppers K, the lower end of the surrounding wall of each hopper being flanged and fastened to a table $K^4$ upon said frame J to which it is bolted. Mounted within each hopper is a rotatable gear ring $K^3$ having a beveled surface with teeth $K^5$ thereon which are adapted to mesh with the teeth of the bevel wheel $K^7$ mounted upon a stub shaft $K^8$, which bevel wheel $K^7$ turns in an opening in the table upon which the hopper rests. The lower edge of said ring $K^3$ rests and turns upon the upper surface of said table which forms the bottom of the hopper. $K^2$ designates a bolt which passes through said table, and L designates a perforated disk which is journaled upon the bolt $K^2$ and has laterally projecting lugs $L'$ positioned diametrically opposite each other, which seat in recesses formed in the inner periphery of said ring $K^3$, causing the disk and ring to rotate together. Leading from the aperture $K^9$ in said table is a spout $K^{10}$ telescoping within the hollow shank portion $K^{11}$ of the subsoiler $K^{12}$. A clamp $K^{13}$ is fixed to the downwardly projecting portion of the frame J and is adapted to hold the subsoiler in an adjusted position.

M designates a hanger mounted upon the shaft $K^8$ and the lower end of said hanger supports the shaft $M'$ having suitable bearings therein and to which shaft are fastened hubs $M^x$ from which extend the radial spokes $M^2$ designed to contact with the ground for the purpose of rotating the shaft to which they are fastened. A sprocket wheel $M^3$ is fixed to the shaft $M'$ and a sprocket chain $M^4$ passes about the sprocket wheel $M^3$ and a sprocket wheel $M^5$ which is fixed to the shaft $K^8$, whereby as the radial spokes rotate with the shaft $M'$, a rotary movement may be imparted to the shaft $K^8$, and also to the rotary seed disks within the seed hoppers.

Referring to Fig. 2 of the drawings, will be seen a segment arm N having teeth $N'$ at one end, said arm being pivotally mounted upon a stub shaft $N^2$ mounted upon the frame J. A second segment member $N^3$ is mounted upon a stub shaft $N^4$ also carried by the frame J, the teeth of the two segment members meshing with each other. An arm of the segment $N^3$ is provided with an aperture through which a rod $N^5$ passes, a spring $N^6$ being interposed between said arm and a nut $N^7$ fitted upon the upper threaded end of the rod $N^5$. The lower end of the rod $N^5$ is pivotally connected to a shutter or second drop valve $N^8$, a detail perspective view of which is shown in Fig. 14 of the drawings. Said shutter is pivotally mounted so that the two wings thereof will tilt within the hollow shank portion of the subsoiler in such a manner that when the shutter is tilted in one direction, its upper wing will be thrown backward, allowing a quantity of seed to fall upon the lower wing, after which, when the shutter is folded in the opposite direction, the upper wing will be thrown across the hollow shank portion of the subsoiler and the seed that fell upon the lower wing will fall to the ground. The upper end of the segment N is forked, as seen at $n$ Fig. 1, to receive the check row wire O, and mounted to rotate horizontally upon the table upon which the seed box rests are the two grooved sheaves Q and Q' in which said wire travels. R and R' designate two other grooved sheaves which also are mounted to rotate horizontally and are also engaged by the check row wire O, and $R^2$ designates a sheave mounted to rotate horizontally upon the frame adjacent to the sheave R'. $N^9$ designates a spring, one end of which is fastened to the frame J and its other end to the segment N, the office of which spring is to serve to normally return the segment to which it is connected to its starting position, after having been tilted backward by one of the buttons upon the check row wire O.

In order to raise and lower the rear portion of the frame J for regulating the depth at which it is desired to have the planter operate, I provide a shaft S, a top plan view of which is shown clearly in Fig. 1 of the drawings, which shaft has angled ends S' each pivoted to a rod $S^2$, which rod passes through an eye T upon the frame J. T' designates a coiled spring which is interposed between the eye T and a collar $T^2$ which is integral with the rod $S^2$. A second spring $T^3$ is interposed between the eye T and a nut or bur $T^5$ upon the lower end of the rod $S^2$. An operating lever $T^8$ is fixed to the shaft S and affords means whereby said shaft may be rocked for the purpose of causing the planting mechanism to be raised or lowered as may be desired. A pawl $T^9$ is mounted upon the lever $T^8$ and is adapted to engage the teeth of a segment $T^{10}$, whereby the lever may be held in an adjusted position.

Referring to Fig. 11 of the drawings, will be seen a yoke W of angular outline having elongated slots W' formed therein, the ends of said yoke being adapted to be fastened by suitable bolts $W^2$ to the downwardly projecting rear portion of the standard J. $W^3$ designate harrow disks which are mounted upon stub shafts $W^4$ adjustably held in the elongated slots W' of said yoke, a detail view of said mechanism being shown clearly in Fig. 4 of the drawings. $W^5$ designates angular harrow carrying arms which are held by the bolts $W^2$ and have pivotally mounted thereon the harrow disks $W^6$. The office of said disk harrows $W^3$ is to open a furrow directly in advance of the subsoiler, and the subsoiler following behind serves to deepen the furrow to receive the seed which, after having fallen to the ground, will be covered by the harrow disks $W^6$ which are disposed at inclinations to each other in such a manner as to cause the disks to cover over the seed within the furrow.

Referring to Fig. 2 of the drawings, when it is desired to adjust the planter for operating as a drill, the lower end of the rod $N^5$ which is angular, is placed within the lower aperture $N^x$ which will hold the shutter so that the wings thereof will not obstruct the passageway leading through the hollow shank portion of the subsoiler, thereby allowing the seed to fall freely to the ground.

In operation, when it is desired to adjust the apparatus so that the harrows will contact with the ground for working the soil, the operating levers $G^2$ are thrown rearward, as shown in Fig. 2 of the drawings, which will cause the wheels H' to be raised from the ground, thus throwing the entire weight of the machine upon the harrow disks. As the apparatus is drawn forward, the harrow disks, which are mounted in the rocking frames of the forward part of the machine, serve to work and loosen the soil, and may be adjusted so that they will follow the irregularities of the surface of the ground and thus prepare the soil for the planting which is accomplished by the rear portion of the apparatus. The plows, which are positioned between the innermost of the harrow disks which are mounted upon the tilting frames, will serve to cut down the ridge which is left between the innermost disks, and after which the harrows $W^3$ will serve to open a furrow which is deepened by the subsoilers for the reception of the seed, which having been deposited, will be covered by the harrow disks $W^6$ which are adjustably mounted and may be held at such angles to each other as to cause the soil to readily cover over the seed in the furrow. Should it be desired to cause the harrows upon the planting part of the apparatus to cut deeper in the soil, the rear portion of the frame J may be forced downward by throwing the lever $T^8$ rearward, as will be readily understood.

What I claim is:—

1. A combined harrow and corn planter comprising a stationary frame, harrow disks carried thereby, a drop axle pivotally mounted upon said frame, wheels journaled upon said axle, means for rocking the axle, whereby the weight of the apparatus may be thrown upon said wheels or upon the harrow disks, a planter frame pivotally connected to said stationary frame, planter apparatus carried by the planter frame, plows carried by the planter frame, and means connecting the two frames for regulating the vertical adjustment of the planter, as set forth.

2. A combined harrow and corn planter comprising a stationary frame, rocking frames connected to the latter, harrow disks carried by the rocking frames, a drop axle pivotally mounted upon said frame, wheels journaled upon said axle, means for rocking the axle, whereby the weight of the apparatus may be thrown upon said wheels or upon the harrow disks, a planter frame pivotally connected to said stationary frame, planter apparatus carried by the planter frame, plows carried by the planter frame, and means connecting the two frames for regulating the vertical adjustment of the planter, as set forth.

3. A combined harrow and corn planter comprising a stationary frame, rocking frames connected to the latter, standards adjustably mounted upon said rocking frames, harrow disks mounted upon said standards, a drop axle pivotally mounted upon said frame, wheels journaled upon said axle, means for rocking the axle, whereby the weight of the apparatus may be thrown upon said wheels or upon the harrow disks, a planter frame pivotally connected to said stationary frame, planter apparatus carried by the planter frame, plows carried by the planter frame, and means connecting the two frames for regulating the vertical adjustment of the planter, as set forth.

4. A combined harrow and corn planter comprising a stationary frame, rocking frames connected to the latter, harrow disks carried by the rocking frames, means for limiting the rocking movements of the latter, a drop axle pivotally mounted upon said frame, wheels journaled upon said axle, means for rocking the axle, whereby the weight of the apparatus may be thrown upon said wheels or upon the harrow disks, a planter frame pivotally connected to said stationary frame, planter apparatus carried by the planter frame, plows carried by the planter frame, and means connecting the two frames for regulating the vertical adjustment of the planter, as set forth.

5. A combined harrow and corn planter comprising a stationary frame, rocking frames connected to the latter, harrow disks carried by the rocking frames, means for limiting the rocking movements of the latter, plates mounted upon said rocking frames adapted to be adjusted relatively to each other, the upper edges of said plates designed to contact with a projecting portion of the stationary frame, whereby the rocking movements thereof may be limited, a drop axle pivotally mounted upon said frame, wheels journaled upon said axle, means for rocking the axle, whereby the weight of the apparatus may be thrown upon said wheels or upon the harrow disks, a planter frame pivotally connected to said stationary frame, planter apparatus carried by the planter frame, plows carried by the planter frame, and means connecting the two frames for regulating the vertical adjustment of the planter, as set forth.

6. A combined harrow and corn planter comprising a stationary frame, rocking frames connected to the latter, harrow disks carried by the rocking frames, means for limiting the rocking movements of the latter, corrugated plates, a bolt passing through the registering apertures in said plates and the rocking frames, one of said plates being adjustable, adapted to contact with a laterally projecting portion of the stationary frame, whereby the rocking movements of the frames carrying said plates may be limited, a drop axle pivotally mounted upon said frame, wheels journaled upon said axle, means for rocking the axle, whereby the weight of the apparatus may be thrown upon said wheels or upon the harrow disks, a planter frame pivotally connected to said stationary frame, planter apparatus carried by the planter frame, plows carried by the planter frame, and means connecting the two frames for regulating the vertical adjustment of the planter, as set forth.

7. A combined harrow and corn planter comprising a stationary frame, rocking frames pivotally mounted thereon, harrow disks carried by the rocking frames, a drop axle pivotally mounted upon said frame, wheels journaled upon said axle, means for rocking the axle, whereby the weight of the apparatus may be thrown upon said wheels or upon the harrow disks, a planter frame, the forwardly projecting arms of which are pivotally connected to the stationary frame, clevises adjustably connected to said planter frame, planter apparatus upon the planter frame, lever mechanism mounted upon the stationary frame, and connections between said lever and planter frame, whereby the latter may be moved vertically, as set forth.

8. A combined harrow and corn planter comprising a stationary frame, rocking frames pivotally mounted thereon, harrow disks carried by the rocking frames, a drop axle pivotally mounted upon said frame, wheels journaled upon said axle, means for rocking the axle, whereby the weight of the apparatus may be thrown upon said wheels or upon the harrow disks, a planter frame, the forwardly projecting arms of which are pivotally connected to the stationary frame, clevises adjustably connected to said planter frame, planter apparatus upon the planter frame, a crank shaft journaled upon the stationary frame, a lever fixed to said crank shaft, and connections between the cranks of said shaft and the planter frame, whereby the latter may be raised and lowered as the crank shaft is rocked by said lever, as set forth.

9. A combined harrow and corn planter comprising a stationary frame, rocking frames pivotally mounted thereon, harrow disks carried by the rocking frames, a drop axle pivotally mounted upon said frame, wheels journaled upon said axle, means for rocking the axle, whereby the weight of the apparatus may be thrown upon said wheels or upon the harrow disks, a planter frame, the forwardly projecting arms of which are pivotally connected to the stationary frame, clevises adjustably connected to said planter frame, planter apparatus upon the planter frame, a crank shaft journaled upon the stationary frame, a lever fixed to said crank shaft, a rod pivotally connected to an arm of the crank shaft and passing through an eye upon the planter frame, burs upon said rods, and springs interposed between said burs and said eyes, as set forth.

10. A combined harrow and corn planter comprising a stationary frame, rocking frames carried thereon, cross-bars upon said rocking frames, standards clamped to said cross-bars, a hollow bearing shaft carried by each standard, a bolt passing through said hollow shaft, harrow disks mounted upon said bolt and held thereby to rotate with said hollow shaft, a planter frame pivotally connected to the stationary frame, planter apparatus upon the planter frame, and connections between the stationary and planter frames, whereby the latter may be moved vertically, as set forth.

In testimony whereof I hereunto affix my signature in the presence of two witnesses.

THOMAS H. SPARKS.

Witnesses:
  A. L. HOUGH,
  FRANKLIN H. HOUGH.